(12) United States Patent
Verhoog

(10) Patent No.: US 10,309,484 B2
(45) Date of Patent: Jun. 4, 2019

(54) DEVICE FOR DAMPING TORSIONAL OSCILLATIONS

(71) Applicant: VALEO EMBRAYAGES, Amiens (FR)

(72) Inventor: Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 445 days.

(21) Appl. No.: 15/202,813

(22) Filed: Jul. 6, 2016

(65) Prior Publication Data
US 2017/0009844 A1    Jan. 12, 2017

(30) Foreign Application Priority Data

Jul. 6, 2015  (FR) ...................................... 15 56398

(51) Int. Cl.
*F02B 75/06*  (2006.01)
*F16F 15/14*  (2006.01)
(Continued)

(52) U.S. Cl.
CPC ............ *F16F 15/145* (2013.01); *F02B 75/18* (2013.01); *F02B 2075/1808* (2013.01);
(Continued)

(58) Field of Classification Search
CPC .... F16F 15/145; F16F 15/31; F16F 2228/001; F16F 15/13469; F16H 2045/0263; F16H 2045/0221; Y10T 74/2128
(Continued)

(56) References Cited

U.S. PATENT DOCUMENTS

| 2,079,227 A | 5/1937 | Sarazin |
| 6,382,050 B1 | 5/2002 | Carlson et al. |

(Continued)

FOREIGN PATENT DOCUMENTS

| DE | 597091 C | 5/1934 |
| DE | 3633584 A1 | 4/1987 |

(Continued)

OTHER PUBLICATIONS

Dresig, Hans et al., "Maschinendynamik", Leipzig: Springer Verlag , 2005, pps. 283-292; English language summary included; ISBN: 3-540-22546-3.

(Continued)

*Primary Examiner* — Marguerite J McMahon
*Assistant Examiner* — James J Kim
(74) *Attorney, Agent, or Firm* — Berenato & White, LLC

(57) ABSTRACT

A device for damping torsional oscillations comprises a support rotatable around an axis. At least one pendulum body is movable with respect to the support. At least one bearing member interacts with at least one raceway integral with the support and with at least one raceway integral with the pendulum body. The bearing member rolls along each raceway around an inactive raceway position. The first region is shaped to filter a first order value of the torsional oscillations by the pendulum body when the bearing member rolls along that first region. Two second regions are beyond an end of the first region. Each second region is shaped to filter a second order value of the torsional oscillations by the pendulum body when the bearing member rolls along one of those second regions. The second order value is strictly lower than the first order value.

18 Claims, 3 Drawing Sheets

(51) Int. Cl.
*F02B 75/18* (2006.01)
*F16H 45/02* (2006.01)

(52) U.S. Cl.
CPC ............... *F02B 2075/1812* (2013.01); *F02B 2075/1816* (2013.01); *F16D 2300/22* (2013.01); *F16H 45/02* (2013.01); *F16H 2045/0263* (2013.01)

(58) Field of Classification Search
USPC ............ 123/192.1; 74/574.2; 192/3.28, 3.29
See application file for complete search history.

(56) References Cited

U.S. PATENT DOCUMENTS

| | | | |
|---|---|---|---|
| 6,450,065 | B1 | 9/2002 | Eckel et al. |
| 10,190,653 | B2 | 1/2019 | Siemens et al. |
| 2012/0055281 | A1* | 3/2012 | Huegel ............... F16F 15/145 74/574.2 |
| 2013/0233124 | A1* | 9/2013 | Wysgol ............... F16F 15/145 74/574.2 |
| 2013/0239746 | A1 | 9/2013 | Movlazada |
| 2014/0013899 | A1* | 1/2014 | Krause ............... F16F 15/145 74/574.2 |
| 2014/0026712 | A1* | 1/2014 | Movlazada ......... F16F 15/145 74/574.2 |
| 2014/0090514 | A1 | 4/2014 | Togel et al. |
| 2014/0174869 | A1 | 6/2014 | Takikawa et al. |
| 2014/0251075 | A1* | 9/2014 | Verhoog ............. F16F 15/145 74/574.2 |
| 2015/0053519 | A1* | 2/2015 | Ray ..................... F16F 7/10 188/378 |
| 2016/0273614 | A1 | 9/2016 | Wirachowski |
| 2019/0011012 | A1* | 1/2019 | Maienschein ....... F16F 15/145 |

FOREIGN PATENT DOCUMENTS

| | | |
|---|---|---|
| DE | 19831160 A1 | 1/2000 |
| DE | 19911560 A1 | 9/2000 |
| DE | 102008005138 A1 | 8/2008 |
| DE | 102011085400 A1 | 5/2012 |
| DE | 102011086532 | 6/2012 |
| DE | 102011076790 A1 | 12/2012 |
| DE | 102012215078 A1 | 3/2013 |
| DE | 102012217170 A1 | 4/2013 |
| DE | 102013217089 A1 | 3/2015 |
| DE | 102013222640 A1 | 5/2015 |
| DE | 102013222647 A1 | 5/2015 |
| EP | 2687749 A1 | 1/2014 |
| EP | 2853773 A1 | 4/2015 |
| EP | 2813729 A1 | 12/2017 |
| WO | WO2008098536 A2 | 8/2008 |
| WO | WO2014009112 A1 | 1/2014 |
| WO | WO2015086944 A1 | 6/2015 |

OTHER PUBLICATIONS

Klotter, Dr.-Ing. Karl, "Technische Schwingungslehre—zweiter Band" Springer Verlag, 1960, pps. 290-300; English language summary included.

European Objection and Brief dated Dec. 17, 2018 against EP 3115639 in the name of Valeo Embrayages; English language translation included.

Kooy, Ad: "Isolation is the Key: The evolution of the centrifugal pendulim-type absorber not only for DMF", Schaeffler Symposium, book 2014, Schaeffler Technologies AG & Co. KG, Apr. 3, 2014, pps. 78-93 https://www.schaeffler.com/remotemedien/media/_shared_media/08_media_library/01_publications/schaeffler_2/symposia_1/downloads_11/Schaeffler_Kolloquium_2014_05_en.pdf.

* cited by examiner

DEVICE FOR DAMPING TORSIONAL OSCILLATIONS

CROSS-REFERENCE TO RELATED APPLICATIONS AND CLAIM TO PRIORITY

This application is related to Patent Application No. 1556398 filed Jul. 6, 2015 in France, the disclosure of which is incorporated herein by reference and to which priority is claimed.

FIELD OF THE INVENTION

The present invention relates to a device for damping torsional oscillations, in particular for a motor vehicle transmission system.

BACKGROUND OF THE INVENTION

In such an application the device for damping torsional oscillations can be integrated into a torsional damping system of a clutch capable of selectively connecting the combustion engine to the gearbox, in order to filter vibrations due to irregularities of the engine.

As a variant, in such an application the device for damping torsional oscillations can be integrated into a friction disk of the clutch or into a hydrodynamic torque converter.

A device of this kind for damping torsional oscillations conventionally utilizes a support and one or more pendulum bodies that are movable with respect to that support, movement of each pendulum body with respect to the support being guided by two bearing members each interacting on the one hand with raceways integral with the support, and on the other hand with raceways integral with the pendulum bodies. Each pendulum body comprises, for example, two pendulum masses riveted to one another.

The device for damping torsional oscillations is configured, for example, so that the torsional oscillations that are filtered correspond to an order lower than 2. Use of the term "order" means, in known fashion, that variable frequencies are filtered, the frequency filtered by the device varying with the speed of the combustion engine of the vehicle. When the device for damping torsional oscillations is configured in this manner, imbalance problems occur at low speeds, for example at speeds below 1500 rpm, in particular below 1000 rpm. For purposes of the present Application, "imbalance" of the device for damping torsional oscillations is referred to when the center of gravity of that device is not identical to the center of rotation of that device, that deviation being caused in the present case at least in part by the pendulum bodies. Since the value and the direction of this imbalance evolve randomly over time, the filtering performance of the pendulum bodies at low speed is then degraded.

SUMMARY OF THE INVENTION

A need thus exists to eliminate all or a portion of the above disadvantage. The object of the invention is to meet that need, and it does so according to one of its aspects with the aid of a device for damping torsional oscillations which comprises:
    a support capable of moving rotationally around an axis;
    at least one pendulum body movable with respect to the support; and
    at least one bearing member interacting with at least one raceway integral with the support, and with at least one raceway integral with the pendulum body, so as to guide the movement of the pendulum body with respect to the support, the bearing member rolling along each raceway around an inactive position on said raceway, at least one of those raceways extending between two ends and comprising:
    a first region extending at least on one side of the inactive position on said raceway, that first region having a shape allowing filtering of a first order value of the torsional oscillations by the pendulum body when the bearing member rolls along that first region, and
    two second regions each arranged beyond an end of the first region, each second region having a shape allowing filtering of a second order value of the torsional oscillations by the pendulum body when the bearing member rolls along one of those second regions, the second order value being strictly lower than the first order value,
    the length of the first region, the length of each second region, the first order value, and the second order value being selected in such a way that the pendulum body filters a third order value strictly comprised between the first and the second order value upon a maximum deflection of that pendulum body.

The pendulum body has an inactive position, and with the pendulum body in that inactive position the bearing member is in contact with the inactive position on each raceway with which it interacts.

The maximum deflection of the pendulum body corresponds, for example, to a rolling of the bearing member along each raceway from the inactive position on said raceway to an end of that raceway, then from that end to the other end of that raceway through the inactive position on that raceway, then from that other end of the raceway to the inactive position on said raceway.

According to the invention, instead of providing a device for damping torsional oscillations which filters only the desired constant order value, which can present problems in terms of imbalance, provision is made to configure, in the vicinity of the inactive position, a first region of the raceway which allows filtering of an order value higher than the desired one. Since this higher-order region is the one that corresponds to all or some of the small displacements of the pendulum body, the imbalance problems are then reduced or even suppressed. The remainder of the raceway is then dimensioned with respect to the first region of that raceway so that the desired order value is globally filtered by the pendulum body when the latter performs a maximum deflection. The result is thus that the desired order value is filtered, solving the imbalance problem.

For purposes of the present Application:
"axially" means "parallel to the rotation axis of the support";
"radially" means "along an axis belonging to a plane orthogonal to the rotation axis of the support and intersecting that rotation axis of the support";
"angularly" or "circumferentially" means "around the rotation axis of the support";
"orthoradially" means "perpendicularly to a radial direction;"
"integral" means "rigidly coupled"; and
the "inactive position" of the device is that position in which the pendulum bodies are subjected to a centrifugal force but not to torsional oscillations deriving from irregularities of the combustion engine.

The first region can extend on both sides of the inactive position on said raceway, i.e. on both sides of that inactive position. The first region is, for example, centered on the inactive position.

The raceway can be exclusively constituted, from one of its ends to the other, by: a second region, the first region containing the inactive position, the other second region, and the transition zones between those regions.

The first region of the raceway exhibits, for example, a circular profile according to a first constant radius; each second region of the raceway exhibits, for example a circular profile according to a second constant radius. The first radius is then preferably smaller than the second radius. When the transition zones exist, they can be zones exhibiting a profile defined by a radius varying between the above first and second radii.

Each transition zone can exhibit a length, measured along said raceway, of less than half the length of the first region. The third order value can be less than or equal to 2, being for example strictly less than 2.

The third order value is, for example, equal to the excitation order of the combustion engine. For purposes of the present Application the "excitation order" of a combustion engine is the number of ignition events of that engine per crankshaft revolution, that excitation order being equal to 2 in the case of a 4-cylinder combustion engine and to 1.5 in the case of a 3-cylinder combustion engine.

The first order value can be equal to 2 and the third order value can be equal to 1 or to 1.5. As a variant, the first order value is equal to 1.5 and the third order value is equal to 1. As mentioned previously, the second order value and each second length are then selected so that the pendulum body filters the third order value in the context of a maximum deflection. When the third order value is equal to 1.5, for example a first order value equal to 2, a first length equal to 2 mm, a second order value equal to 1.42, and each second length equal to 6 mm, are selected.

The length of the first region can be between 5% and 15%, in particular being equal to 10%, of the length of said raceway, that length of that raceway being measured between the two ends of that raceway along the latter.

Due to the existence of the first region, the raceway has in that first region an effective shape different from the hypothetical shape that it would have if it were entirely configured to permit filtering only of the second order value, and the length of the first region can furthermore be selected so that the deviation between the effective shape and the hypothetical shape is greater than a given manufacturing tolerance value for the raceway.

The aforementioned raceway can be a raceway integral with the support. As a variant or in combination, the raceway can be one integral with the pendulum body.

Each raceway interacting with the bearing member can then comprise:
  a first region extending at least on one side, in particular on both sides, of the inactive position on said raceway, that first region having a shape allowing filtering of the first order value when the bearing member rolls along that first region; and
  two second regions each arranged beyond an end of the first region, each second region having a shape allowing filtering of the second order value when the bearing member rolls along one of those second regions.

Each bearing member is, for example, a roller having a circular section in a plane perpendicular to the rotation axis of the support. This roller can have a circular cross section.

The roller, in particular its axial ends, can be devoid of a fine annular rim. The roller is made, for example, of steel. The roller can be hollow or solid.

The shape of the aforesaid raceways can be such that each pendulum body is moved with respect to the support only in translation around a notional axis parallel to the rotation axis of the support.

As a variant, the shape of the raceways can be such that each pendulum body is moved with respect to the support:
  both in translation around a notional axis parallel to the rotation axis of the support, and also
  rotationally around the center of gravity of said pendulum body, such a motion also being called a "combined motion" and being disclosed, for example, in the Application DE 10 2011 086 532.

The device comprises, for example, a number of pendulum bodies between two and eight, in particular three or six. All these pendulum bodies can be successive to one another circumferentially. The device can thus comprise a plurality of planes, perpendicular to the rotation axis, in each of which all the pendulum bodies are arranged.

In all of the above the support can be implemented as a single part, being for example entirely metallic.

The pendulum body can comprise a first and a second pendulum mass, spaced axially with respect to one another and movable with respect to the support, the first pendulum mass being arranged axially on a first side of the support and the second pendulum mass being arranged axially on a second side of the support, and at least one connecting member between the first and the second pendulum mass pairing said pendulum masses.

Each connecting member can be received in a window configured in the support.

Each pendulum body comprises, for example, two connecting members pairing the first and the second pendulum mass, and each connecting member can be received in a separate window configured in the support. These two connecting members are then offset angularly.

The raceway integral with the pendulum body can be defined by the connecting member. A region of the periphery of that connecting member defines, for example, that raceway integral with the pendulum body. In this case a portion of the periphery of the window in which that connecting member is arranged can have a continuous periphery, a portion of which then defines the raceway, integral with the support, with which that bearing member interacts in order to guide the movement of that pendulum body with respect to the support. Each end of a raceway can then be defined as being one of the positions of said raceway in contact with the bearing member when the pendulum body comes into abutment against the support upon filtering of a torsional oscillation.

A connecting member of this kind is, for example, press-fitted via each of its axial ends into an opening configured in one of the pendulum masses. As a variant, the connecting member can be welded via its axial ends onto each pendulum mass.

The movement of each pendulum body with respect to the support is guided, for example, by two different bearing members, and that pendulum body can comprise two connecting members pairing the first and the second pendulum mass, each connecting member defining a raceway interacting respectively with one of the bearing members. Each bearing member then interacts with only one raceway integral with the pendulum body.

Each bearing member can then be stressed exclusively in compression between the raceway integral with the support and the raceway integral with the pendulum body, as mentioned above. These raceways interacting with the same bearing member can be at least in part radially facing, i.e. there exist planes, perpendicular to the rotation axis, in which both of those raceways extend.

As a variant, each bearing member can interact with two raceways integral with the pendulum body, one of those raceways being defined by the first pendulum mass and the other of those raceways being defined by the second pendulum mass. Each connecting member is then, for example, a rivet, being received in a window; and the bearing member is then received in a cavity configured in the support and different from that window. A portion of the edge of that cavity then defines the raceway integral with the support. In this variant each bearing member can then comprise, axially successively:

- a region arranged in a cavity of the first pendulum mass and interacting with the raceway constituted by a portion of the edge of that cavity;
- a region arranged in a cavity of the support and interacting with the raceway constituted by a portion of the edge of that cavity; and
- a region arranged in a cavity of the second pendulum mass and interacting with the raceway constituted by a portion of the edge of that cavity.

In another variant the pendulum body can comprise a single pendulum mass, or several pendulum masses, arranged axially between two supports rigidly coupled to one another.

In all of the above, the device can comprise at least one interposition part limiting the axial movement of the pendulum body with respect to the support, thus preventing axial impacts between said parts and thus undesirable wear and noise, especially when the support and/or the pendulum mass are made of metal. Several interposition parts, for example in the form of sliders, can be provided. The interposition parts are made in particular of a damping material such as plastic or rubber.

The interposition parts are, for example, carried by the pendulum bodies. The interposition parts can be positioned on a pendulum body in such a way that there is always at least one interposition part at least a portion of which is interposed axially between a pendulum mass and the support, no matter what the relative positions of the support and of said mass are upon movement of the pendulum body with respect to the support.

In all of the above, each pendulum body can be equipped with one or more stop damping members allowing a reduction in impacts between the pendulum body and the support following a displacement of the pendulum body from the inactive position and/or in the event of a radial drop of the pendulum body, for example upon stoppage of the combustion engine of the vehicle.

Each stop damping member is, for example, arranged radially between the radially inner edge of the connecting member and the radially inner edge of the window of the support in which that connecting member is received.

In a particular exemplifying embodiment of the invention each pendulum body comprises two connecting members; each connecting member interacts with one bearing member; and each connecting member is associated with one stop damping member.

Each stop damping member can have elastic properties allowing damping of impacts associated with the occurrence of contact between the pendulum body and the support. Each stop damping member is made, for example, of elastomer or rubber.

A further object of the invention in accordance with another of its aspects is a component for a transmission system of a motor vehicle, the component being in particular a dual mass flywheel, a hydrodynamic torque converter, or a friction clutch disk, or a dry or wet dual clutch or a wet single clutch or a flywheel integral with a crankshaft, comprising a device as defined above for damping torsional oscillations.

The support of the device for damping torsional oscillations can then be one among:
- a web of the component;
- a guide washer of the component;
- a phase washer of the component; or
- a support different from said web, said guide washer, and said phase washer.

A further object of the invention in accordance with another of its aspects is a drive train for a motor vehicle, comprising:
- a combustion engine, in particular having two, three, or four cylinders; and
- a component as described above, the third order value being determined as a function of the excitation order of that combustion engine.

The third order value is equal, in particular, to the excitation order of the combustion engine.

As a variant, the first order value can be equal to the excitation order of the combustion engine, while the second order value is equal to a fraction of that excitation order of the combustion engine, for example to half that excitation order, the second order value corresponding in particular to an operating mode of that combustion engine in which some of its cylinders are deactivated.

BRIEF DESCRIPTION OF THE DRAWINGS

A better understanding of the invention may be gained from reading the description below of non-limiting exemplifying embodiments thereof, and from an examination of the attached drawings, in which.

DETAILED DESCRIPTION OF THE PREFERRED EMBODIMENT(S)

Figure 1:
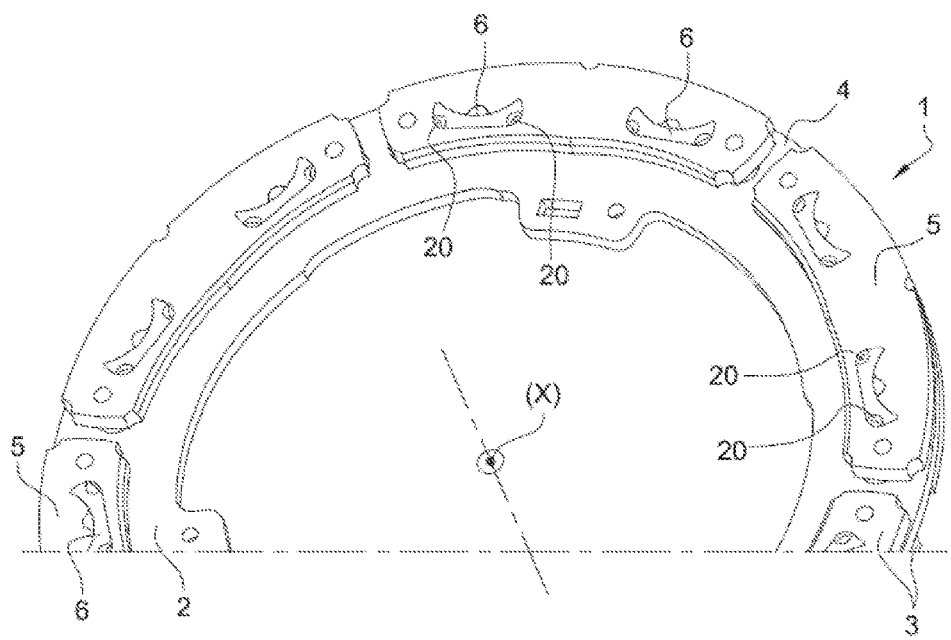
FIG. 1 schematically and partly depicts a device for damping torsional oscillations into which the invention can be integrated.

FIG. 1 depicts a device 1 for damping torsional oscillations. Damping device 1 is of the pendulum oscillator type. Device 1 is capable in particular of being part of a motor vehicle transmission system, for example being integrated into a component (not depicted) of such a transmission system, that component being, for example, a dual mass flywheel, a friction clutch disk, or a hydrodynamic torque converter.

That component here is part of a drive train of a motor vehicle, that drive train comprising a combustion engine respectively having in particular two or three or four cylinders. The excitation order of the combustion engine is then equal respectively to one or to one and a half or to two.

In FIG. 1 device 1 is inactive, i.e. it is not filtering the torsional oscillations transmitted by the drive train due to irregularities of the combustion engine.

In known fashion, such a component can comprise a torsional damper exhibiting at least one input element, at least one output element, and circumferentially acting elastic return members that are interposed between said input and output elements. For purposes of the present Application the terms "input" and "output" are defined with respect to the direction of torque transmission from the combustion engine of the vehicle toward the latter's wheels.

In the example considered, device 1 comprises:
a support 2 capable of moving rotationally around an axis X; and
a plurality of pendulum bodies 3 movable with respect to support 2.

In the example considered, six pendulum bodies 3 are provided, being distributed uniformly around axis X.

Support 2 of damping device 1 can be constituted by:
an input element of the torsional damper;
an output element or an intermediate phasing element arranged between two series of springs of the damper; or
an element rotationally connected to one of the aforementioned elements and different from the latter, being then, for example, a support specific to device 1.

Support 2 is in particular a guide washer or a phase washer. As a variant, support 2 is a flange of the component.

In the example considered, support 2 is globally in the shape of a ring having two opposite sides 4 that here are planar faces.

As is evident from FIG. 1, in the example considered each pendulum body 3 comprises:
two pendulum masses 5, each pendulum mass 5 extending axially facing one side 4 of support 2; and
two connecting members 6 integrating the two pendulum masses 5.

Each pendulum mass 5 thus has a face 7 arranged axially facing one side 4 of support 2, and a face 8 opposite to face 7.

In the example considered, connecting members 6, also called "spacers," are angularly offset.

Each connecting member 6 extends in part in a window 9 configured in support 2. In the example considered, window 9 defines an open space inside the support, that window being defined by a continuous periphery 10. Each connecting member 6 is integrated with each pendulum mass 5 by being, for example, press-fitted into an opening 18 configured in said pendulum mass 5.

Figure 2:
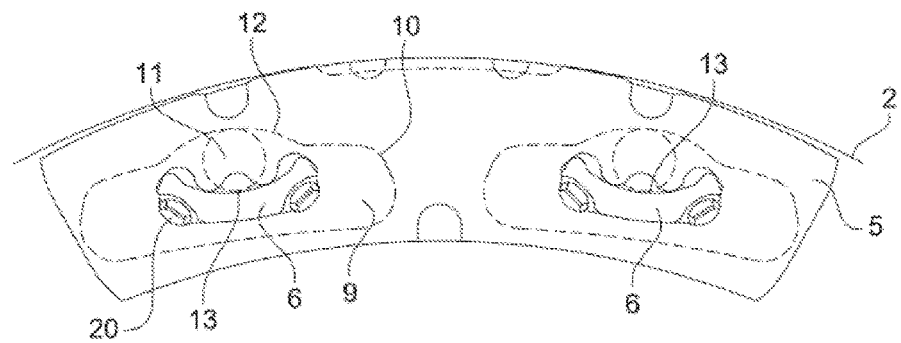
FIG. 2 shows a detail of FIG. 1.

In the example considered, device 1 also comprises bearing members 11, which are visible e.g. in FIG. 2 and which guide the movement of pendulum bodies 3 with respect to support 2. Bearing members 11 here are rollers having a circular cross section.

In the example described, the motion of each pendulum body 3 with respect to support 2 is guided by two bearing members 11, each of them interacting with one of connecting members 6 of pendulum mass 3.

Each bearing member 11 interacts on the one hand with a raceway 12 that is integral with support 2 and that is constituted here by a portion of periphery 10 of window 9 configured in the support, and on the other hand with a raceway 13 that is integral with pendulum body 3 and is constituted here by a portion of the outer periphery of connecting member 6. Raceway 13 here is concave in shape.

More specifically, each bearing member 11 interacts radially internally with raceway 13 and radially externally with raceway 12 in the context of its movement with respect to support 2 and to pendulum body 3, being stressed, for example, exclusively in compression between the aforementioned raceways 12 and 13.

As is evident from FIG. 2, device 1 can also comprise stop damping members 20 capable of coming into contact simultaneously with a connecting member 6 and with support 2 in certain relative positions of support 2 and of pendulum bodies 3, such as the abutment positions following a deflection from the inactive position. Each stop damping member 20 here is integral with a pendulum body 3, being mounted on each pendulum mass and arranged so as to become radially interposed between connecting member 6 and periphery 10 of opening 9.

A raceway 13 according to exemplifying embodiments of the invention will now be described in more detail with reference to FIGS. 3 and 4.

This raceway 13 extends between two angular ends P2 and P2' which correspond to the extreme positions on that raceway of bearing member 11 interacting with that raceway 13, those extreme positions being reached when connecting member 6 comes into abutment against support 2 upon a maximum deflection of pendulum body 3 from its inactive position in the case of filtering of a torsional oscillation. The position P0 of raceway 13 corresponds to the contact point of bearing member 11 on that raceway 13 when pendulum body 3 is inactive.

In the example considered, raceway 13 exhibits in its central portion a first region 30 extending on both sides of the position P0, and this first region 30 is flanked by two second regions 31. In the example considered, first region 30 exhibits a first constant radius, and each second region 31 exhibits the same constant second radius that is greater than the first radius.

First region 30 here is centered on the position P0, and it extends counter-clockwise to a position P1 and clockwise to a position P1', while one of the two regions 31 extends between the positions P1 and P2 and the other second region 31 extends between the positions P1' and P2'.

The length of first region 30, hereinafter called the "first length," is measured between the positions P1 and P1' along raceway 13 and is a curvilinear dimension; and the length of each second region 31, again called hereinafter a "second length," is measured respectively between the positions P1 and P2 and between the positions P1' and P2' along the raceway. The length of the raceway is measured between the positions P2 and P2' along that raceway. In the interest of simplification, the transition zones between first region 30 and each second region 31 are considered here to be point-like and to be limited to the points P1 and P1'.

Figure 3:
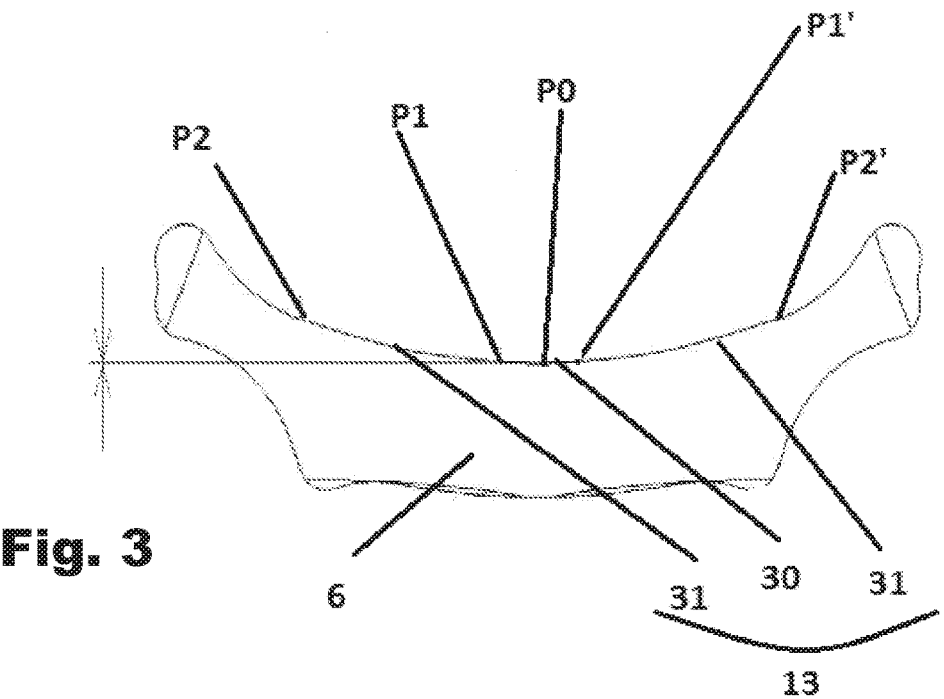
FIGS. 3 and 4 depict two different exemplifying embodiments of a raceway integral with the pendulum body.

As is evident from FIG. 3, the first length is equal to approximately 10% of the length of raceway 13.

First region 30 here has a radius selected so that pendulum body 3 filters a first order value when bearing member 11 rolls along that region 30, while second regions 31 each exhibit the same radius, selected so that pendulum body 3 filters a second order value when bearing member 11 rolls along one of those regions 31.

In the example considered, the length of the first region, the length of each second region, the first order value, and the second order value are selected so that pendulum body 3 filters a third order value equal to the excitation order of the combustion engine of the drive train upon a maximum deflection of that pendulum body 3. This maximum deflection of pendulum body 3 corresponds to a rolling of bearing member 11 along that raceway 13:
from the position P0 respectively to the position P2 or P2';

then respectively from the position P2 to the position P2' through the position P0, or from the position P2' to the position P2 through the position P0;

then to the next passage through the position P0.

Small deflections are thus limited to a path in first region 30, so that they thus correspond to a higher filtering order than the larger deflections.

In the example of FIG. 3 the third order value is equal to 1.5, the first order value is equal to 2 with a first length of 2 mm, while each second region has a length of 6 mm with a second order value of 1.42.

The first and the second length can moreover be determined as a function of an additional parameter taking into account manufacturing tolerances. This is because, due to the existence of first region 30, raceway 13 has at that first region 30 a shape different from the one it would have had if raceway 13 had had a shape selected to allow only filtering of the second order value. When the difference between these two shapes is less than the usual manufacturing tolerance values for connecting member 6, the risk exists that for certain parts, that difference in shape will not exist or will not be of sufficient magnitude.

Figure 4:
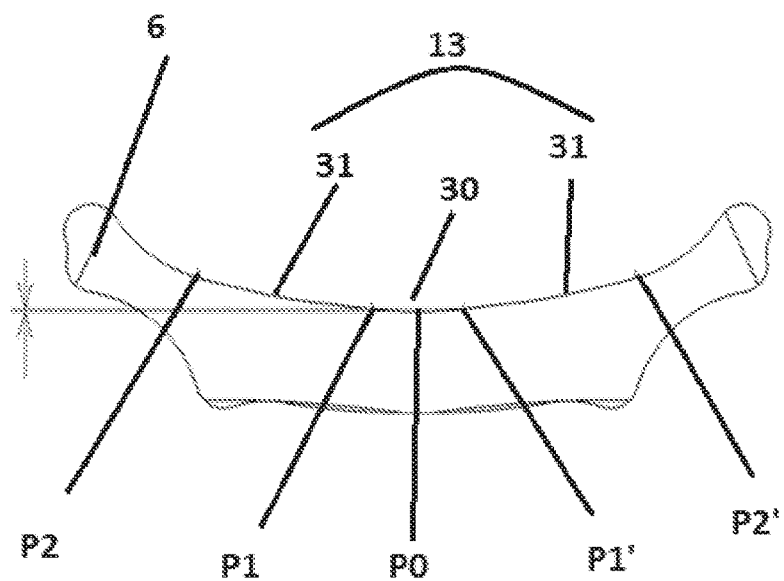

As depicted in FIG. 4, in order to ensure that the shape difference will in fact exist even in consideration of the above tolerance, it is desirable to increase the size of first region 30 and consequently to reduce that of each second region 31.

All connecting members 6 of all pendulum bodies 3 of device 1 have, for example, a raceway 13 as described respectively with reference to FIG. 3 or to FIG. 4.

Each raceway 12 integral with support 2 can likewise be as described above with reference to raceway 13, i.e. can have a first central region corresponding to a higher order than that of the second regions which flank that first region.

The invention is not limited to the example that has just been described.

Figure 5:
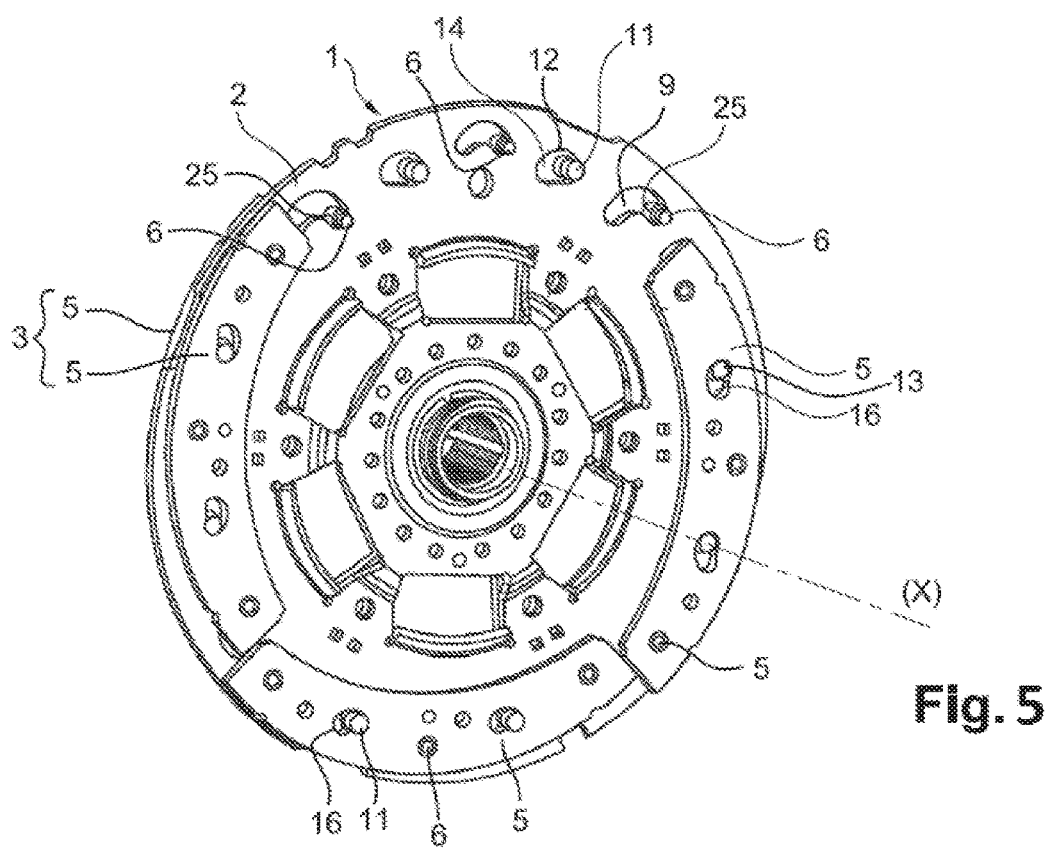
FIG. 5 depicts another example of a device for damping torsional oscillations into which the invention according to FIGS. 3 and 4 can be integrated.

A raceway 13 as described with reference to FIGS. 3 and 4 can also be integrated into the torsional damping device of the pendulum type which is already known and is depicted in FIG. 5. This device 1 differs from the one just described in particular in that connecting members 6 and raceways 12 and 13 are different. Connecting members 6 here are rivets, and each rivet 6 extends along an axis that, in the example considered, is parallel to rotation axis X. Each connecting member 6 extends in part in a window 9 configured in the support.

Again according to the example of FIG. 5, each bearing member 11 interacts on the one hand with a raceway 12 that is defined by support 2 and that is constituted here by a portion of the edge of a cavity 14 configured in support 2 and different from window 9, and on the other hand with two raceways 13 defined by pendulum body 3. Each pendulum mass 5 of pendulum body 3 here exhibits, for each bearing member 11, a cavity 16, a portion of whose edge defines a raceway 13. Each of these raceways 13 then comprises a first region 30 flanked by two second regions 31, and these first 30 and second portions 31 are as described with reference to FIGS. 3 and 4.

According to this example each bearing member 11 comprises, axially successively:

a region arranged in a cavity 16 of first pendulum mass 5 and interacting with raceway 13 constituted by a portion of the edge of that cavity 16;

a region arranged in a cavity 14 of support 2 and interacting with raceway 12 constituted by a portion of the edge of that cavity 14; and a region arranged in a cavity 16 of the second pendulum mass 5 and interacting with raceway 13 constituted by a portion of the edge of that cavity 16.

The invention claimed is:

1. A device (1) for damping torsional oscillations, comprising:
   a support (2) capable of moving rotationally around an axis (X);
   at least one pendulum body (3) movable with respect to the support (2); and
   at least one bearing member (11) interacting with at least one raceway (12) integral with the support (2), and with at least one raceway (13) integral with the pendulum body (3), so as to guide the movement of the pendulum body (3) with respect to the support (2), the bearing member (11) rolling along each raceway (12, 13) around an inactive position (P0) on said raceway,
   at least one of those raceways (12, 13) extending between two ends (P2, P2') and comprising:
   a first region (30) extending at least on one side of the inactive position (P0) on said raceway (12, 13), that first region (30) having a shape allowing filtering of a first order value of the torsional oscillations by the pendulum body (3) when the bearing member (11) rolls along that first region (30), and
   two second regions (31) each arranged beyond an end (P1, P1') of the first region (30), each second region (31) having a shape allowing filtering of a second order value of the torsional oscillations by the pendulum body (3) when the bearing member (11) rolls along one of those second regions (31), the second order value being strictly lower than the first order value,
   the length of the first region (30), the length of each second region (31), the first order value, and the second order value being selected in such a way that the pendulum body (3) filters a third order value strictly comprised between the first and the second order value upon a maximum deflection of that pendulum body (3).

2. The device according to claim 1, the first region (30) extending on both sides of the inactive position (P0) on said raceway (12, 13).

3. The device according to claim 1, the raceway (13) integral with the pendulum body (3) and the raceway (12) integral with the support (2) each comprising:
   a first region (30) extending at least on one side of the inactive position (P0) on said raceway, in particular on both sides of that inactive position (P0), that first region (30) having a shape allowing filtering of a first order value of the torsional oscillations by the pendulum body (3) when the bearing member rolls along that first region (30); and
   two second regions (31) each arranged beyond an end of the first region (30), each second region (31) having a shape allowing filtering of a second order value of the torsional oscillations by the pendulum body (3) when the bearing member (11) rolls along one of those second regions (31), the second order value being strictly lower than the first order value,
   the length of the first region (30), the length of each second region (31), the first order value, and the second order value being selected in such a way that the pendulum body (3) filters a third order value strictly comprised between the first and the second order value upon a maximum deflection of that pendulum body.

4. The device according to claim 1, the third order value being strictly lower than 2.

5. The device according to claim 4, the first order value being equal to 2 and the third order value being equal to 1 or to 1.5, or the first order value being equal to 1.5 and the third order value being equal to 1.

6. The device according to claim 1, the length of the first region (30) being between 5% and 15%, in particular being equal to 10%, of the length of the raceway (12, 13), that length of that raceway (12, 13) being measured between the two ends (P2, P2') of that raceway (12, 13).

7. The device according claim 1, the pendulum body (3) comprising a first (5) and a second pendulum mass (5), spaced axially with respect to one another and movable with respect to the support (2), the first pendulum mass (5) being arranged axially on a first side (4) of the support (2) and the second pendulum mass (5) being arranged axially on a second side (4) of the support (2), and at least one connecting member (6) between the first (5) and the second pendulum mass (5) pairing said pendulum masses (5).

8. The device according to claim 7, the raceway (13) integral with the pendulum body (3) being defined by the connecting member (6).

9. The device according to claim 7, comprising two raceways (13) integral with the pendulum body (3), one of those raceways (13) being defined in the first pendulum mass (5) and the other of those raceways (13) being defined by the second pendulum mass (5).

10. A component for a transmission system of a motor vehicle, the component being in particular a dual mass flywheel, a hydrodynamic torque converter, or a friction clutch disk, or a dry or wet dual clutch or a wet single clutch or a flywheel integral with a crankshaft, comprising a damping device (1) according to claim 1.

11. A drive train for a motor vehicle, comprising:
a combustion engine, in particular having two, three, or four cylinders; and
a component according to claim 10, the third order value being determined as a function of the excitation order of that combustion engine, in particular being equal to the excitation order of that combustion engine.

12. The device according to claim 2, the raceway (13) integral with the pendulum body (3) and the raceway (12) integral with the support (2) each comprising:
a first region (30) extending at least on one side of the inactive position (P0) on said raceway, in particular on both sides of that inactive position (P0), that first region (30) having a shape allowing filtering of a first order value of the torsional oscillations by the pendulum body (3) when the bearing member rolls along that first region (30); and
two second regions (31) each arranged beyond an end of the first region (30), each second region (31) having a shape allowing filtering of a second order value of the torsional oscillations by the pendulum body (3) when the bearing member (11) rolls along one of those second regions (31), the second order value being strictly lower than the first order value, the length of the first region (30), the length of each second region (31), the first order value, and the second order value being selected in such a way that the pendulum body (3) filters a third order value strictly comprised between the first and the second order value upon a maximum deflection of that pendulum body.

13. The device according to claim 2, the third order value being strictly lower than 2.

14. The device according to claim 3, the third order value being strictly lower than 2.

15. The device according to claim 2, the length of the first region (30) being between 5% and 15%, in particular being equal to 10%, of the length of the raceway (12, 13), that length of that raceway (12, 13) being measured between the two ends (P2, P2') of that raceway (12, 13).

16. The device according to claim 3, the length of the first region (30) being between 5% and 15%, in particular being equal to 10%, of the length of the raceway (12, 13), that length of that raceway (12, 13) being measured between the two ends (P2, P2') of that raceway (12, 13).

17. The device according to claim 4, the length of the first region (30) being between 5% and 15%, in particular being equal to 10%, of the length of the raceway (12, 13), that length of that raceway (12, 13) being measured between the two ends (P2, P2') of that raceway (12, 13).

18. The device according to claim 5, the length of the first region (30) being between 5% and 15%, in particular being equal to 10%, of the length of the raceway (12, 13), that length of that raceway (12, 13) being measured between the two ends (P2, P2') of that raceway (12, 13).

* * * * *